United States Patent
Zolotow et al.

(10) Patent No.: US 12,445,379 B2
(45) Date of Patent: Oct. 14, 2025

(54) MANAGING BANDWIDTH IN FIBRE CHANNEL OVER INTERNET PROTOCOL COMMUNICATION CHANNELS

(71) Applicant: KYNDRYL, INC., New York, NY (US)

(72) Inventors: Clea Zolotow, Dublin (IE); Stephen Robert Guendert, Murfreesboro, TN (US); Gavin Charles O'Reilly, Kilcoole (IE)

(73) Assignee: Kyndryl, Inc., New York, NY (US)

( * ) Notice: Subject to any disclaimer, the term of this patent is extended or adjusted under 35 U.S.C. 154(b) by 2 days.

(21) Appl. No.: 18/322,085

(22) Filed: May 23, 2023

(65) Prior Publication Data

US 2023/0300073 A1    Sep. 21, 2023

Related U.S. Application Data

(63) Continuation of application No. 17/484,028, filed on Sep. 24, 2021, now Pat. No. 11,700,203.

(51) Int. Cl.
*H04L 47/12* (2022.01)
*H04L 47/70* (2022.01)
*H04L 49/00* (2022.01)
*H04L 69/16* (2022.01)

(52) U.S. Cl.
CPC ............ *H04L 47/12* (2013.01); *H04L 47/825* (2013.01); *H04L 49/70* (2013.01); *H04L 69/169* (2013.01)

(58) Field of Classification Search
CPC ....... H04L 47/12; H04L 47/825; H04L 49/70; H04L 69/169
See application file for complete search history.

(56) References Cited

U.S. PATENT DOCUMENTS

| | | | |
|---|---|---|---|
| 9,923,798 B1 | 3/2018 | Bahadur | |
| 2008/0144641 A1* | 6/2008 | Le Roux | H04L 45/10 370/401 |
| 2009/0248845 A1 | 10/2009 | Waltermann et al. | |
| 2011/0225303 A1* | 9/2011 | Engebretson | H04L 47/193 709/227 |
| 2012/0157106 A1 | 6/2012 | Wang et al. | |
| 2012/0230328 A1* | 9/2012 | Morrill | H04L 67/14 370/389 |
| 2015/0180740 A1* | 6/2015 | Yoshida | G06F 17/18 370/252 |

(Continued)

OTHER PUBLICATIONS

Blue et al. "Fabric Resiliency Best Practices", http://www.redbooks.ibm.com/redpapers/pdfs/redp4722.pdf, 2018, 76 pages.

(Continued)

*Primary Examiner* — Shawn D Miller
(74) *Attorney, Agent, or Firm* — Erik Swanson; Andrew M. Calderon; Calderon Safran & Wright P.C.

(57) ABSTRACT

Methods and systems include managing bandwidth in Fibre Channel over Internet Protocol (FCIP) communication channels. A method includes monitoring traffic demand at an FCIP communication channel and, in response to an anticipated period of throughput demand on the FCIP communication channel, reallocating physical throughput bandwidth of the FCIP communication channel by configuring bandwidth of one or more tunnels of the FCIP communication channel.

20 Claims, 9 Drawing Sheets

(56) References Cited

U.S. PATENT DOCUMENTS

2017/0070437 A9    3/2017  Patel et al.
2020/0342302 A1*  10/2020  Pratihar .................. G06N 20/00
2021/0014135 A1*   1/2021  Wong .................... H04L 41/5009
2021/0072893 A1    3/2021  Singh et al.
2023/0101268 A1    3/2023  Zolotow et al.

OTHER PUBLICATIONS

Hunt et al., "TCP/IP Window Sizes in Data Center Migrations", https://www.cmg.org/wp-content/uploads/2012/04/m_88_5.pdf, Apr. 2012, 2 pages.

Anonymous, "TCP Windows Sizes", http://www.nren.nasa.gov/tcpwindows.html, Mar. 23, 2007, 2 pages.

List of IBM Patents or Patent Applications Treated as Related, dated May 22, 2023, 1 page.

* cited by examiner

MANAGING BANDWIDTH IN FIBRE CHANNEL OVER INTERNET PROTOCOL COMMUNICATION CHANNELS

BACKGROUND

Aspects of the present invention relate to communication between storage area networks, and more specifically, to managing bandwidth in Fibre Channel over Internet Protocol communication channels.

Fibre Channel (FC) is a high-speed data transfer protocol providing in-order, lossless delivery of raw block data. Fibre Channel is primarily used to connect computer data storage to servers in storage area networks (SAN) in commercial data centers. Fibre Channel networks form a switched fabric because the switches in a network operate in unison as one big switch. Fibre Channel typically runs on optical fiber cables within and between data centers, but can also run on copper cabling.

Fibre Channel over Internet Protocol (FCIP or FC/IP, also known as Fibre Channel tunneling or storage tunneling) is an Internet Protocol (IP) for storage technology for linking Fibre Channel storage area networks.

An FCIP entity referred to as an extension switch functions to encapsulate Fibre Channel frames and forward them over an IP network. FCIP entities are peers that communicate using the Internet Protocol suite, Transmission Control Protocol/IP (TCP/IP). FCIP technology overcomes the distance limitations of native Fibre Channel, enabling geographically distributed storage area networks to be connected using existing IP infrastructure, while keeping fabric services intact. The Fibre Channel fabric and its devices remain unaware of the presence of the IP network.

SUMMARY

According to an aspect of the present invention there is provided a computer-implemented method for managing bandwidth in Fibre Channel over Internet Protocol (FCIP) communication channels, comprising: monitoring traffic demand at an FCIP communication channel; and, in response to an anticipated period of throughput demand on the FCIP communication channel, reallocating physical throughput bandwidth of the FCIP communication channel by configuring bandwidth of one or more tunnels of the FCIP communication channel.

According to another aspect of the present invention there is provided a system for managing bandwidth in Fibre Channel over Internet Protocol (FCIP) communication channels. The system includes a processor and a memory configured to provide computer program instructions to the processor, the program instructions executable to: monitor traffic demand at an FCIP communication channel; and, in response to an anticipated period of throughput demand on the FCIP communication channel, reallocate physical throughput bandwidth of the FCIP communication channel by configuring bandwidth of one or more tunnels of the FCIP communication channel.

According to a further aspect of the present invention there is provided a computer program product for managing bandwidth in Fibre Channel over Internet Protocol (FCIP) communication channels, the computer program product comprising a computer readable storage medium having program instructions embodied therewith, the program instructions executable by a processor to cause the processor to: monitor traffic demand at an FCIP communication channel; and in response to an anticipated period of throughput demand on the FCIP communication channel, reallocate physical throughput bandwidth of the FCIP communication channel by configuring bandwidth of one or more tunnels of the FCIP communication channel.

BRIEF DESCRIPTION OF THE DRAWINGS

Aspects of the invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings.

Figure 1:
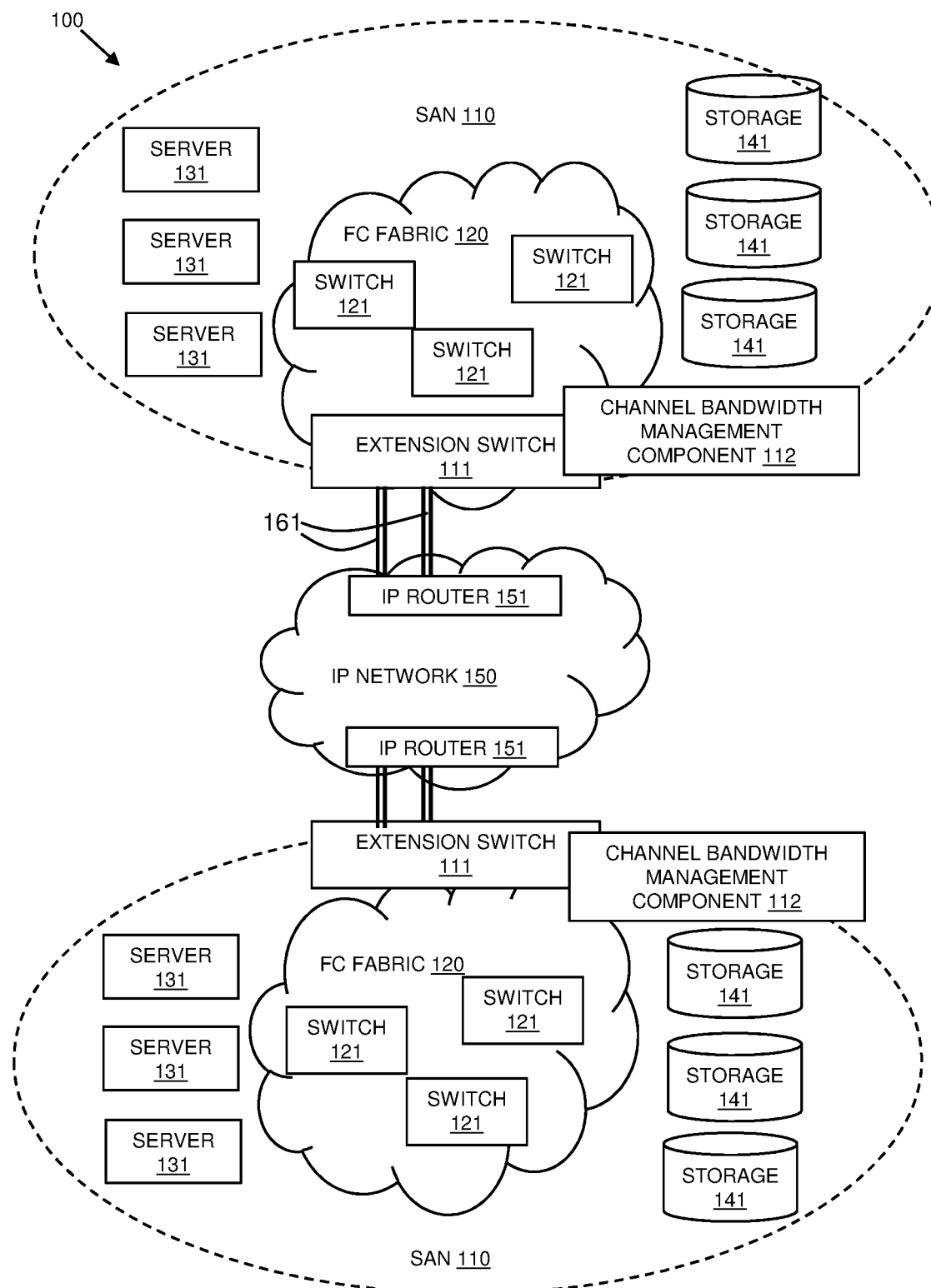
FIG. 1 is a block diagram showing communication between storage area networks using Fibre Channel over Internet Protocol in accordance with aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Bandwidth for FCIP is conventionally set with a minimum and a maximum value. When there are multiple tunnels configured to use a single IP link there is a limited amount of bandwidth on that single IP link even if there are other unused tunnels to that link.

The described method and system provide an intelligent management of bandwidth in Fibre Channel over Internet Protocol (FCIP) communication channels between storage area networks. Intelligent management may use traffic analysis and forecasting to manage bandwidth of FCIP communication channels between storage area networks. FCIP communication channels are formed of extension tunnels from extension switches of a Fibre Channel fabric. The term "FCIP communication channel" is used to refer to a single IP link (referred to as a circuit) provided by one or more extension tunnels or to a single tunnel with one or more circuits.

A method and system are provided for reallocating bandwidth from between FCIP tunnel reservations for an IP link based on throughput demand or planned policy reallocation. The reallocation may be carried out based on the traffic demand at the IP link being monitored. This may be monitored based on historical traffic demand and/or monitored in real time.

Reallocating bandwidth of a tunnel may be carried out either by changing the tunneling parameters (min/max) balanced across the network system in order to provide bandwidth to the circuit, or by taking the extension switch elements and virtualizing them by into a management, control and data plane to allow for reallocated throughput.

In an embodiment, a method is used to change the tunneling parameters (for example, their defined minimum and maximum) balanced across the network system in order to provide bandwidth. This is particularly useful when multiple tunnels are configured to use a single IP link and there is a limited amount of bandwidth on that single IP link. Unused tunnels and their respective bandwidth may be reallocated to the IP link.

In another embodiment, a switch virtualization pulls the functionality of the entire extension switch apart into a management, control and data plane, and controls all the IP links and tunnels and their associated performance, allowing for increased throughput. By moving to a management, control, and data plane, where the extension switches remain as a control plane and moving the management functions to a management plane, redundancy and tolerance issues can be overcome. This provides the ability to dynamically reallocate bandwidth for configured FCIP tunnel bandwidth based on throughput demand or planned policy/timed reallocation. These exemplary embodiments may be used individually or in a combined system.

Referring to FIG. 1, a block diagram shows a storage environment 100 including two storage area networks (SAN) 110 connected via an IP network 150.

Each SAN 110 includes a switched fabric in the form of a Fibre Channel (FC) fabric 120 formed of a plurality of switches 121 that operate in unison. The FC fabric 120 provides high-speed data transfer of raw blocks of data, in the form of Fibre Channel frames, between servers 131 and storage devices 141 that form the SAN 110.

Storage tunnelling between SANs 110 is provided to overcome distance limitations of the FC fabric 120 by encapsulating and forwarding Fibre Channel frames over an IP network. An extension switch 111 is provided at an edge of the FC fabric 120 and uses Fibre Channel over IP (FCIP) as an Internet Protocol to communicate with other extension switches 111 in other SANs 110 using TCP/IP. FCIP encapsulates Fibre Channel frames within TCP/IP and sends those packets over the IP-based network (such as a wide area network (WAN)). Fibre Channel traffic is carried over the IP network so the Fibre Channel is not aware of the IP network 150. This enables geographically distributed SANs 110 to be connected using existing IP network 150 infrastructure, whilst keeping fabric services intact. The IP network 150 includes IP routers 151 that handle the IP protocol.

The extension switches 111 take a Fibre Channel frame and encapsulate it into TCP/IP across the IP network 150 connection. FC frames enter FCIP through Virtual Extension Ports (VE_Ports) and are encapsulated and passed to the TCP layer connections. The VE_Ports are virtual because they face the extension tunnel and thus enable communication across an extension tunnel. On the receiving end, the extension switch 111 takes away the TCP/IP headers resulting in a clean, native Fibre Channel frame. The extension switches 111 are FCIP devices and the IP network 150 is invisible to the switches and the payload in the form of the Fibre Channel content is buried in the IP datagram transparent to the IP network 150.

FCIP extension "tunnels" 161 are used to pass Fibre Channel I/O through the IP network 150. The tunnels 161 are built on a physical connection between extension switches 111, in the form of two peer switches or blades. Once a TCP connection is established between FCIP entities, a tunnel is established. The two FCIP platforms at the FCIP tunnel endpoints establish a standard FC inter-switch link (ISL) through this tunnel. Each end of the FCIP tunnel appears to the IP network as a server, not as a switch. The FCIP tunnel itself appears to the switches to be just a cable. Each tunnel carries a single FC ISL.

A FCIP circuit consists of a source and destination IP address pair and is the FCIP connection between the two IP addresses. A port may contain one or more circuits, each requiring a unique IP address. For each tunnel, a single circuit or a trunk consisting of multiple circuits may be configured. A tunnel scales bandwidth with each added circuit, providing lossless recovery during path failures and ensuring in-order frame delivery.

FCIP trunking is an FCIP tunnel with more than one circuit, also known as a Link Aggregation Group (LAG) or port channel. As the tunnel scales with additional circuits, it forms a single logical tunnel. FCIP trunking provides a single logical ISL but physically has multiple circuits allowing bandwidth aggregation of each circuit, load balancing, failover, lossless link loss, and in-order delivery (IOD). Conventionally, trunking uses a simplistic weighted round-robin approach.

Trunking is architected by creating logical circuits within the FCIP tunnel allowing multiple circuits. Trunking does not allow additional tunnels; it merely provides the ability to create new circuits within the existing tunnel. The described method adds the trunking circuit functionality into tunneling by enabling the aggregation of multiple circuits within the tunnel, or all circuits within the tunnel.

A VE_Port may provide a tunnel having a single circuit or a trunking tunnel having multiple circuits. A single VE_Port is utilized per tunnel 161 and is limited to the throughput allowed by the parameter values of minimum and maximum throughput configured for that FCIP tunnel profile. Multiple FCIP tunnel profiles may be configured on the same circuit.

According to aspects of the invention, methods and systems provide a channel bandwidth management component 112 that intelligently manages the throughput of tunnels 161 that use one circuit and/or tunnels 161 having multiple circuits forming trunking.

The channel bandwidth management component 112 may be provided at an extension switch 111 as a management plane. Alternatively, the channel bandwidth management component 112 may be provided as a component in the SAN 110 with a control component provided at the extension switch 111. The channel bandwidth management component 112 may gather historical and/or current performance data and traffic to provide analytics to predict a required throughput of a tunnel.

In embodiments, bandwidth reallocation is provided by changing tunneling parameters balanced across the network system in order to provide bandwidth to a circuit and/or by virtualizing and controlling the entire extension switch.

Figure 2:
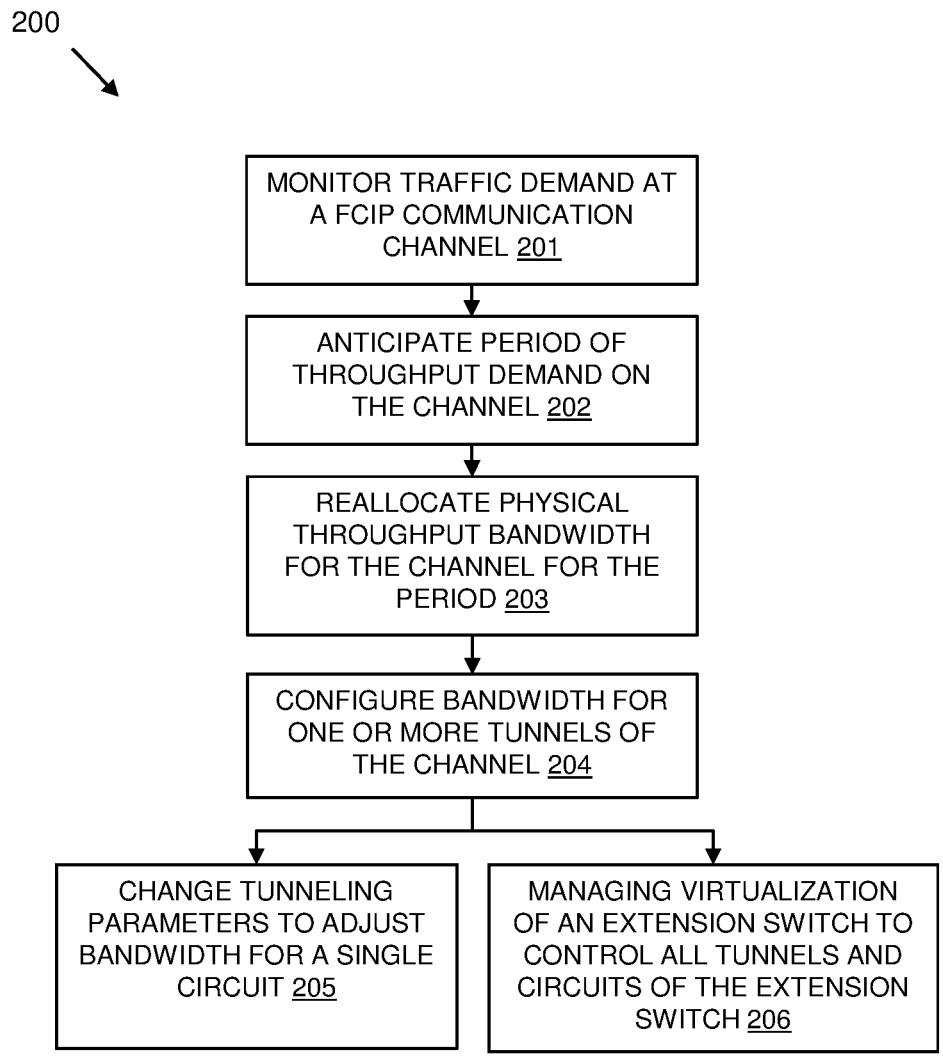
FIG. 2 is flow diagram of an embodiment of a method of channel bandwidth management in accordance with aspects of the present invention.

Referring to FIG. 2, a flow diagram 200 shows an example embodiment of the described method. At step 201 of the method, a system monitors traffic demand at an FCIP communication channel. This may be traffic demand at a channel formed of multiple tunnels using a single circuit or at a channel in the form of a single tunnel having one or more circuits.

At step 202 of the method, the system anticipates a period of throughput demand on the FCIP communication channel based on the monitored traffic demand.

At steps 203 and 204 of the method, the system reallocates physical throughput bandwidth of the FCIP communication channel by configuring bandwidth of one or more tunnels of the FCIP communication channel.

The monitoring the traffic demand at step 201 may be carried out in real-time and the reallocating the physical throughput bandwidth at step 203 may be carried out dynamically.

Alternatively or additionally, the monitoring the traffic demand at step 201 may be carried out by monitoring historical traffic demand and the reallocating the physical throughput bandwidth at step 203 may be carried out in a pre-scheduling manner. This may apply cognitive forecasting using machine learning to predict throughput demand of the FCIP communication channel based on the historical traffic demand and patterns with pre-scheduling of bandwidth according to the predicted throughput demand.

In embodiments, the configuring the bandwidth of one or more tunnels at step 204 includes adjusting a Transfer Communication Protocol (TCP) sliding window. The configuring the bandwidth of one or more tunnels at step 204 may include changing the tunneling parameters balanced across a network system at step 205 in order to provide adjusted bandwidth to a single circuit. Configuring bandwidth of one or more tunnels may include managing a virtualization of an extension switch of the FCIP communication channel at step 206 to control all tunnels and circuits of the extension switch. Tunnel scheduling may also be handled by a machine learning component to ensure in-order delivery in trunking tunnels.

Figure 3:
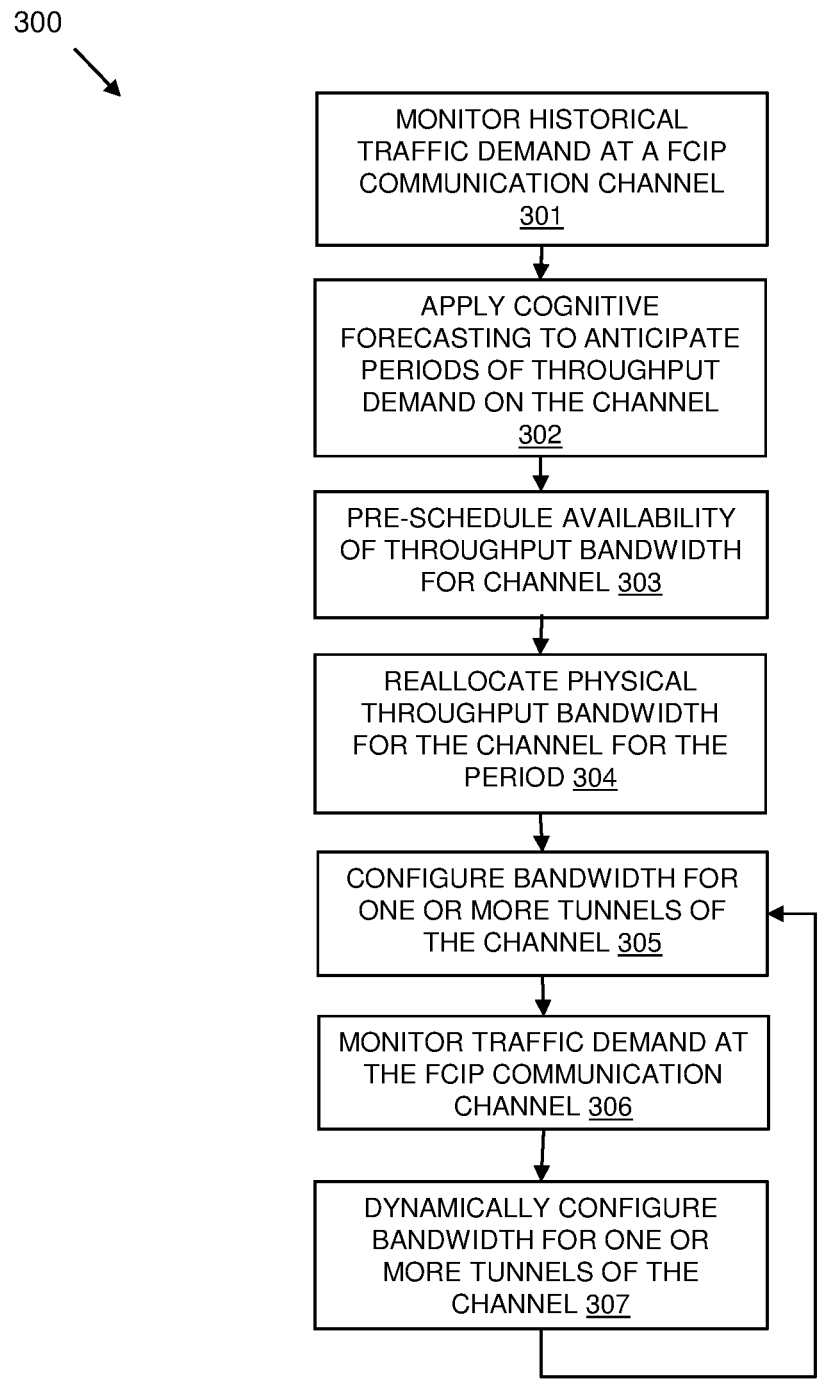
FIG. 3 is flow diagram of another embodiment of a method of channel bandwidth management in accordance with aspects of the present invention.

Referring to FIG. 3, a flow diagram 300, shows another example embodiment of the described method showing the predictive and real-time aspects of the described bandwidth reallocation.

At step 301 of the method, a system monitors historical traffic demand at an FCIP communication channel including performance data from the Fibre Channel fabric including throughput demand data, insights data, and policy/timed allocation requirements.

At step 302 of the method, the system applies cognitive forecasting to anticipate periods of throughput demand on the channel based on the historical monitoring. Availability of throughput bandwidth may be pre-scheduled at step 303 for the channel for the anticipated periods by reallocating physical throughput bandwidth of the channel at step 304. This may include configuring bandwidth at step 305 either across the multiple tunnels for a single circuit, or across the circuits of a trunking tunnel as described in relation to FIG. 2.

In real-time, at steps 306 and 307 of the method, the system additionally monitors traffic demand at the FCIP communication channel and dynamically configures bandwidth for the one or more tunnels of the channel.

Figure 4:
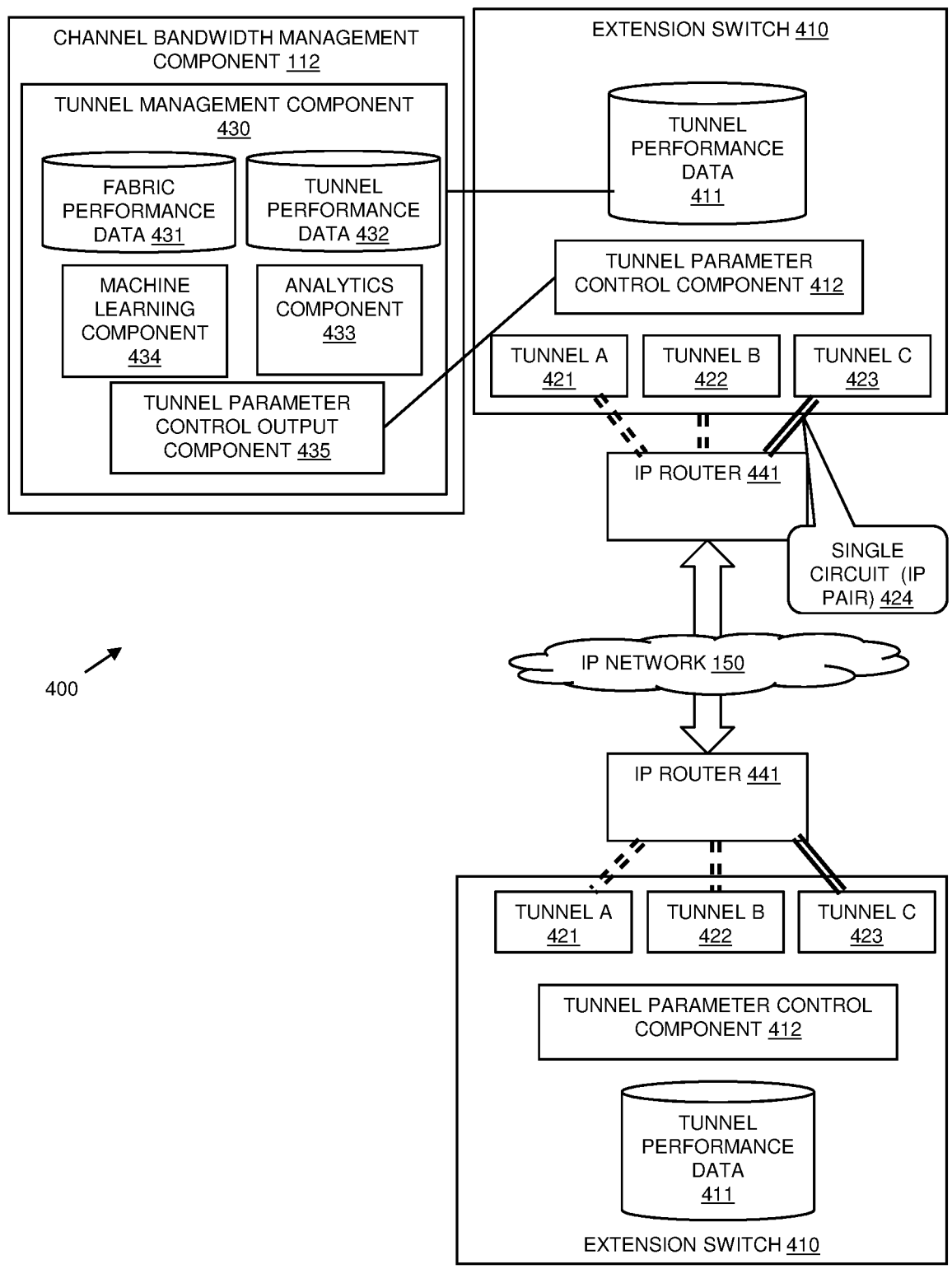
FIG. 4 is a block diagram of a first example embodiment of a channel bandwidth management system at a tunnel parameter level in accordance with aspects of the present invention.

Referring to FIG. 4, an embodiment of the described system is shown in an example system 400. In this embodiment, the channel bandwidth management component 112 includes a tunnel management component 430.

The tunnel management component 430 may constantly monitor the performance statistics of all configured FCIP tunnels' usage in the form of tunnel performance data 432 gathered from tunnel performance data 411 of the extension switch 411. The tunnel management component 430 may also obtain fabric performance data 431 to gather throughput performance data such as demand data, insights data, and policy/timed allocation requirements.

The tunnel management component 430 may use the fabric performance data 431 by applying a machine learning component 434 to provide predictions of the expected bandwidth requirements. An analytics component 433 may also use the tunnel performance data 432 to determine a current state of the bandwidth usage.

The tunnel management component 430 may include a tunnel parameter control output component 435 to dynamically control the modification of the optimal bandwidth parameter values (such as the minimum or maximum values) of a tunnel to increase or decrease the demand for the throughput. The tunnel parameter control output component 435 may instruct a tunnel parameter control component 412 at the extension switch 410, for example, in the form of a cognitive virtual engineer (bot). This is handled within the IP stack management of the extension switch 410.

In embodiments, the Fibre Channel fabric and all Fibre Channel targets and initiators are not aware of the IP network 150. This means that the activity of adding additional tunnels is not handled by the Fibre Channel itself; it must be handled within the IP stack management.

The tunnel parameter control component 412 may balance the tunnel parameters across the entire FCIP network that is configured in order to provide bandwidth to the circuit. This may provide additional bandwidth capacity where it is needed.

In embodiments, the performance features of the SAN operating system, such as Rate Limiting, Traffic Policing, and Traffic Shaping are used to smooth out the frame delivery as the tunnel approaches the upper maximum value. By having the ability to dynamically add bandwidth from other unused tunnel reservations, this will assist with the bursty storage traffic demands.

FIG. 4 shows three FCIP tunnels 421, 422, 423 configured to share a single circuit 424. At different times of the day, the throughput demands vary depending on what applications are running. Due to this varied demand, in embodiments FCIP tunnels' profiles are set with a minimum/maximum value of, for example, 1.5/2 Gbps. This is an approach to dealing with varied demands; however, this approach is not the most optimal usage of the available bandwidth.

In the example shown in FIG. 4, Tunnel C 423 has a peak demand that is fully utilizing the set maximum available bandwidth. This data flow is now being optimized as best possible by features such as rate limiting and traffic shaping to keep the flow running with the restriction of the set maximum. However, the best solution is more bandwidth and having the ability to dynamically increase the minimum/maximum values allows the utilization of more bandwidth on demand.

In embodiments, the tunnel management component 430 analyzes performance data or workload patterns from historical performance data and instructs changes to the FCIP profile that defines the tunnel parameter values when required. In the example, the tunnel parameter control component 412 learns that Tunnel C 423 has reached its maximum and has its minimum/maximum dynamically increased by setting the FCIP profile for a bandwidth setting of 2.5/3 Gbps. This action provides adequate throughput by removing the congestion.

The tunnel parameter control component 412 may handle the TCP/IP packet header to increase distances via the sliding window. This mechanism may be used to change the configured parameter values, such as the maximum/minimum values. TCP has a sliding window that limits the transmission speed in order to reduce congestion and data loss. This is a variable-duration window that allows the transmitting end-host to send a specified number of data units before an acknowledgement is received. The TCP window contains the amount of outstanding data a transmitting end-host can send on a particular connection before it gets acknowledgment back from the receiving end-host.

As SAN operating systems are now providing embedded analytics functionality, there is more data available local with the extension switch 410 for real time data and historical data available to external performance management tooling.

Figure 5:
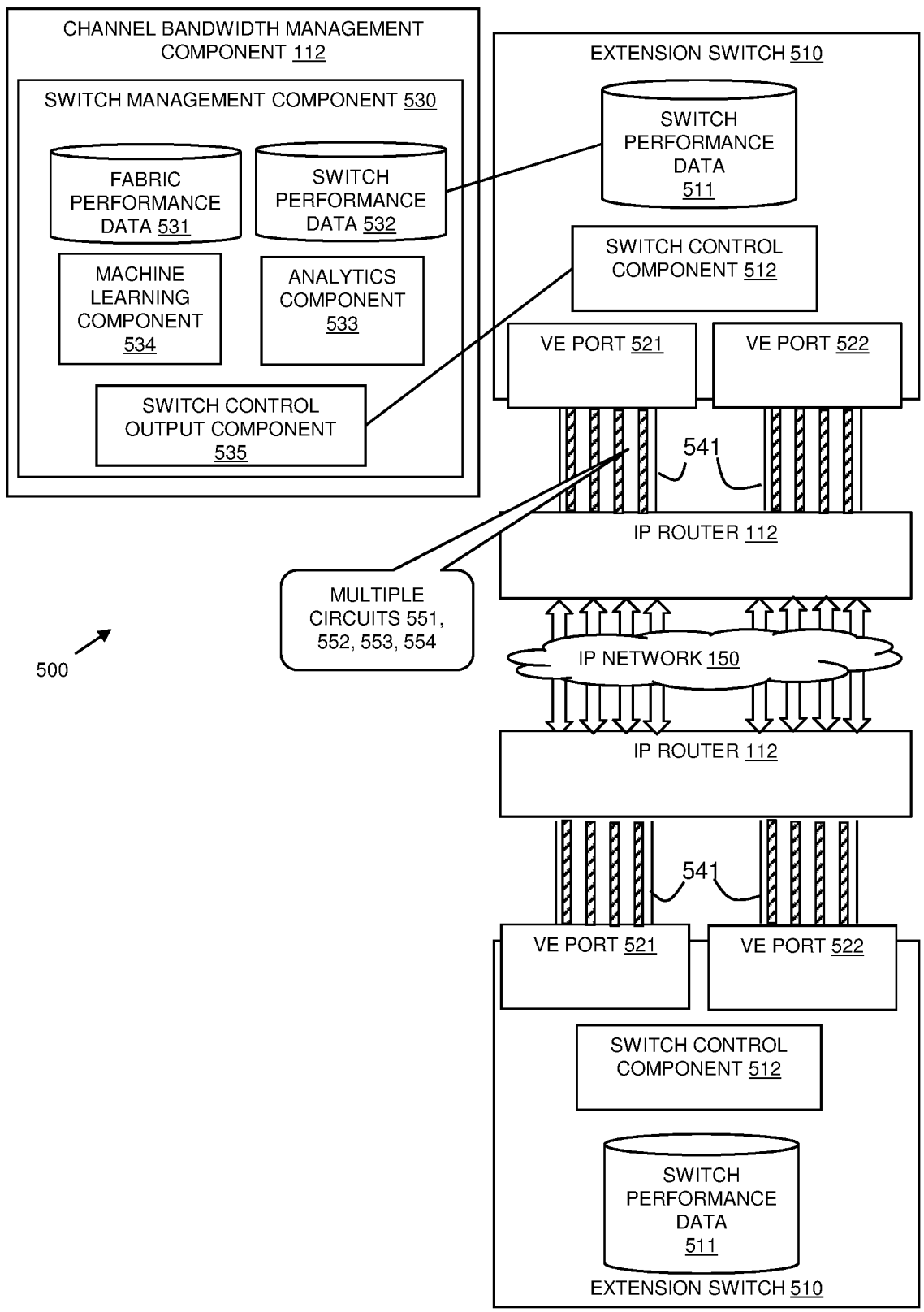
FIG. 5 is a block diagram of a second example embodiment of a channel bandwidth management system at a switch level in accordance with aspects of the present invention.

Referring to FIG. 5, an embodiment of the described system is shown in an example system 500. In this embodiment, the channel bandwidth management component 112 includes a switch management component 530. The functionality of the entire extension switch 510 is pulled apart into a management, control and data plane, and controls all the tunnels and associated performance, allowing for increased throughput.

In this embodiment, the switch management component 530 provides a management plane and a switch control component 512 at the extension switch 510 provides a control plane to handle the VE_Port 521, 522 utilizations, the aggregation of the bandwidth, and the In-Order-Delivery (IOD).

The switch management component 530 may include equivalent components to the tunnel management component 430 of the first embodiment including gathering switch performance data 532 from switch performance data 511 of the extension switch 510 and gathering fabric performance data 531 from the fabric. An analytics component 533 and a machine learning component 534 may be provided and a switch control output component 535 may instruct a switch control component 512 at the extension switch to control all the tunnels and associated performance, allowing for increased throughput.

In FIG. 5, two FCIP trunking tunnels 541 are shown each with multiple circuits 551-554 going into three unique IP addresses. In embodiments, these circuits 551-554 go through the IP network 150 and reach the other end, where they are stripped of their TCP/IP data. In one example, the switch management component 530 provides the management plane and handles the invocation of when and which additional circuits are ready to submit. This management function, controlling the data plane, provides advantageous functionality, some aspects of which are listed below.

The switch control component 512 may handle the TCP/IP packet header to increase distances via the sliding window. TCP has a sliding window that limits the transmission speed in order to reduce congestion and data loss. This is a variable-duration window that allows the transmitting end-host to send a specified number of data units before an acknowledgement is received. The TCP window contains the amount of outstanding data a transmitting end-host can send on a particular connection before it gets acknowledgment back from the receiving end-host. Embodiments include increasing the length of the TCP/IP component so that it is not limited by the acknowledge back.

The switch control component 512 may schedule the circuits from tunnels in order to increase throughput based on machine learning. Machine learning may learn when peak periods are for the circuits and can pre-schedule them appropriately based on the workload placement.

The switch control component 512 may handle the in-order delivery from the various tunnels. In-order delivery needs to happen so that the frames arrive in the correct order from the tunnels. When tunnels are altered, the in-order delivery is affected. The tunnel scheduling can be handled by the machine learning component as well.

On the control plane, the incoming data may be managed by a Network Advisor component that includes a component called Monitoring and Alerting Policy Suite (MAPS) which applies pre-built, customizable rules and policies to multiple ports, switches, or fabrics to visualize health and performance statistics of the SAN infrastructure. The control plane can utilize MAPs to adjust the configurations and also encompass the existing functionality of the VE_Ports themselves.

Embodiments provide the capability to create multiple physical (not virtual) tunnels dynamically and to reallocate bandwidth across these physical tunnels. In this manner, implementations of the invention examine available bandwidth outside that previously committed, and make adjustments and configuration changes on the fly.

This may be used to address the traffic patterns and use cases most common for use of FCIP, which is storage replication traffic between data centers. This is not bursty, but is steady and a bandwidth intensive application.

Figure 6:
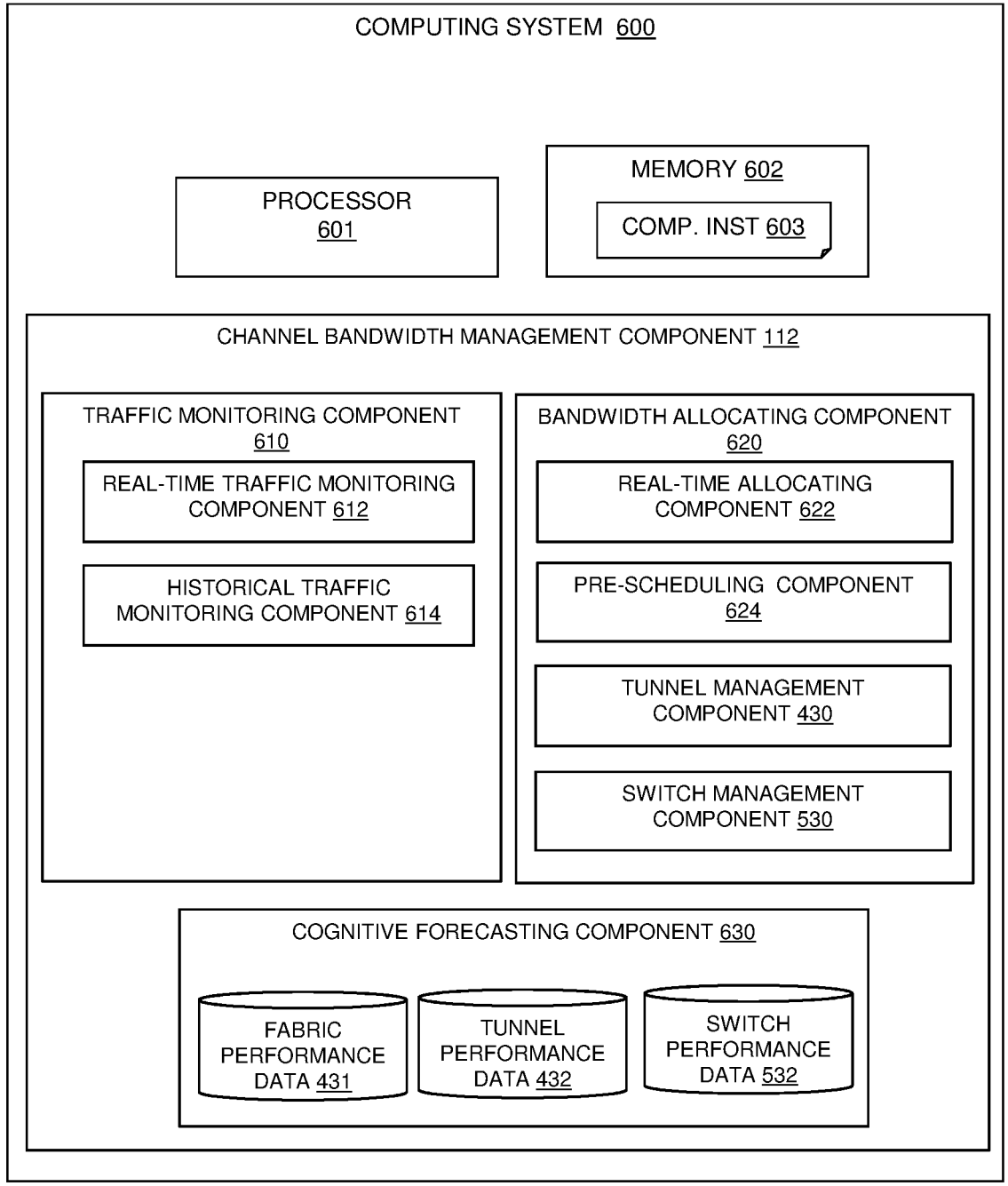
FIG. 6 is a block diagram of a computing system providing a channel bandwidth management component in accordance with aspects of the present invention.

Referring to FIG. 6, a block diagram shows a computing system 600 at which the described channel bandwidth management component 112 may be provided. The computing system 600 may include at least one processor 601, a hardware module, or a circuit for executing the functions of the described components which may be software units executing on the at least one processor. The described components may include routines, programs, objects, components, logic, data structures, and so on that perform particular tasks or implement particular data types. Multiple processors running parallel processing threads may be provided enabling parallel processing of some or all of the functions of the components. Memory 602 may be configured to provide computer instructions 603 to the at least one processor 601 to carry out the functionality of the components.

The channel bandwidth management component 112 may include a traffic monitoring component 610 for monitoring traffic demand at an FCIP communication channel. This may include a real-time traffic monitoring component 612 for carrying out monitoring of traffic demand at the FCIP communication channel in real time.

The traffic monitoring component 610 may include an historical traffic monitoring component 614 for monitoring historical traffic patterns of a Fibre Channel fabric and of the communication channel.

The channel bandwidth management component 112 may include a cognitive forecasting component 630 for applying cognitive forecasting to predict throughput demand of the FCIP communication channel. This may be based on fabric performance data 431, tunnel performance data 432, and/or extension switch performance data 532.

The channel bandwidth management component 112 may include a bandwidth allocating component 620 for, in response to an anticipated period of throughput demand on the FCIP communication channel, reallocating physical throughput bandwidth of the FCIP communication channel by configuring bandwidth of one or more tunnels of the FCIP communication channel. The bandwidth allocating component 620 may configure bandwidth of one or more tunnels includes adjusting a Transfer Communication Protocol (TCP) sliding window.

The bandwidth allocating component 620 may include a real-time allocating component 622 for dynamically reallocating physical throughput bandwidth.

The bandwidth allocating component 620 may also include a pre-scheduling component 624 for reallocating physical throughput bandwidth by pre-scheduling according to the predicted throughput demand. The pre-scheduling component 624 for tunnel scheduling may include an in-order delivery component to ensure in-order delivery in trunking tunnels.

The bandwidth allocating component 620 may include a tunnel management component 430 for changing the tunneling parameters balanced across a network system in order to provide adjusted bandwidth to a single circuit as described in relation to FIG. 4, The bandwidth allocating component 620 may include a switch management component 530 for managing a virtualization of an extension switch of the FCIP communication channel to control all tunnels and circuits of the extension switch as described in relation to FIG. 5.

Figure 7:
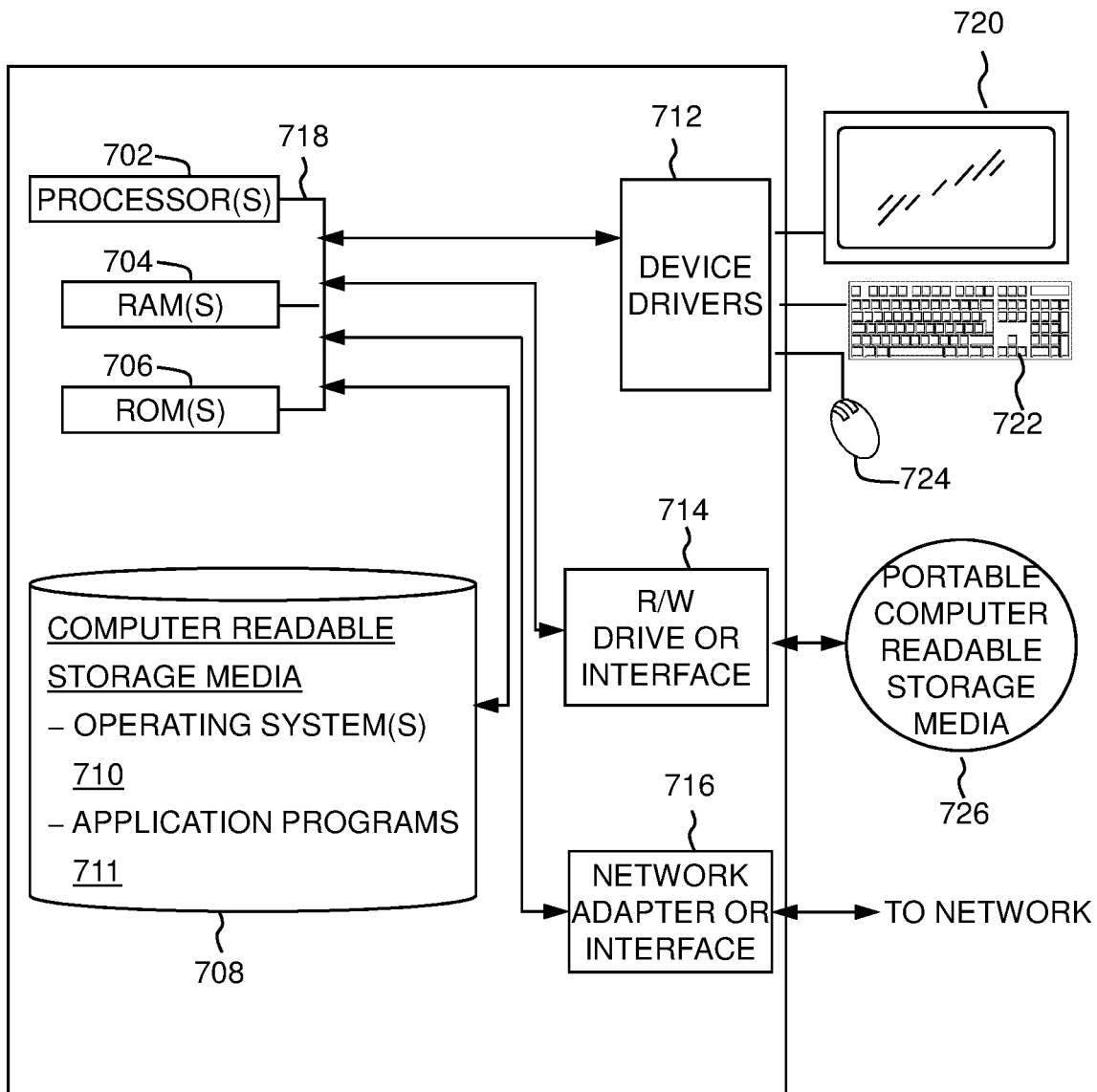
FIG. 7 is a block diagram of an embodiment of a computer system or cloud server in which aspects of the present invention may be implemented.

FIG. 7 depicts a block diagram of components of a computing system as used for the computing system 600, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The computing system can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 714 to read from and write to one or more portable computer readable storage media 726. Application programs 711 on the computing system can be stored on one or more of the portable computer readable storage media 726, read via the respective R/W drive or interface 714 and loaded into the respective computer readable storage media 708.

The computing system can also include a network adapter or interface 716, such as a TCP/IP adapter card or wireless communication adapter. Application programs 711 on the computing system can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

The computing system can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
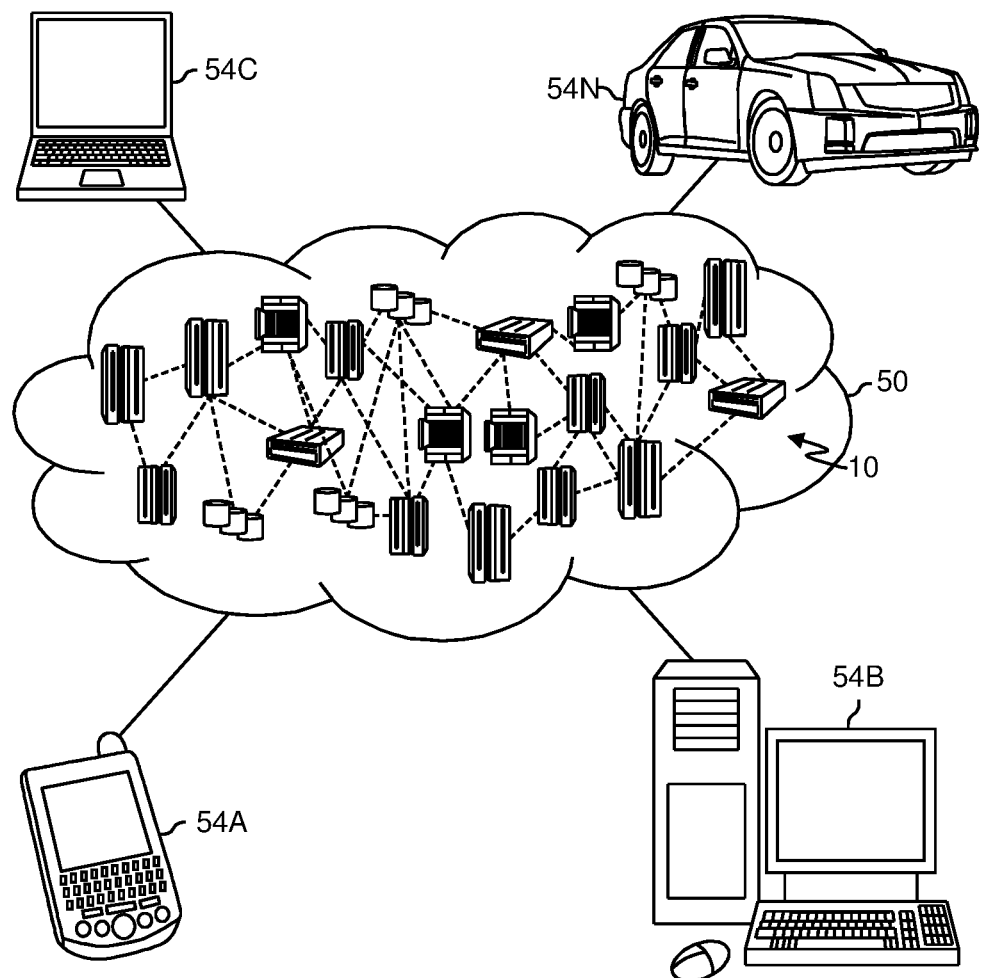
FIG. 8 is a schematic diagram of a cloud computing environment in which aspects of the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
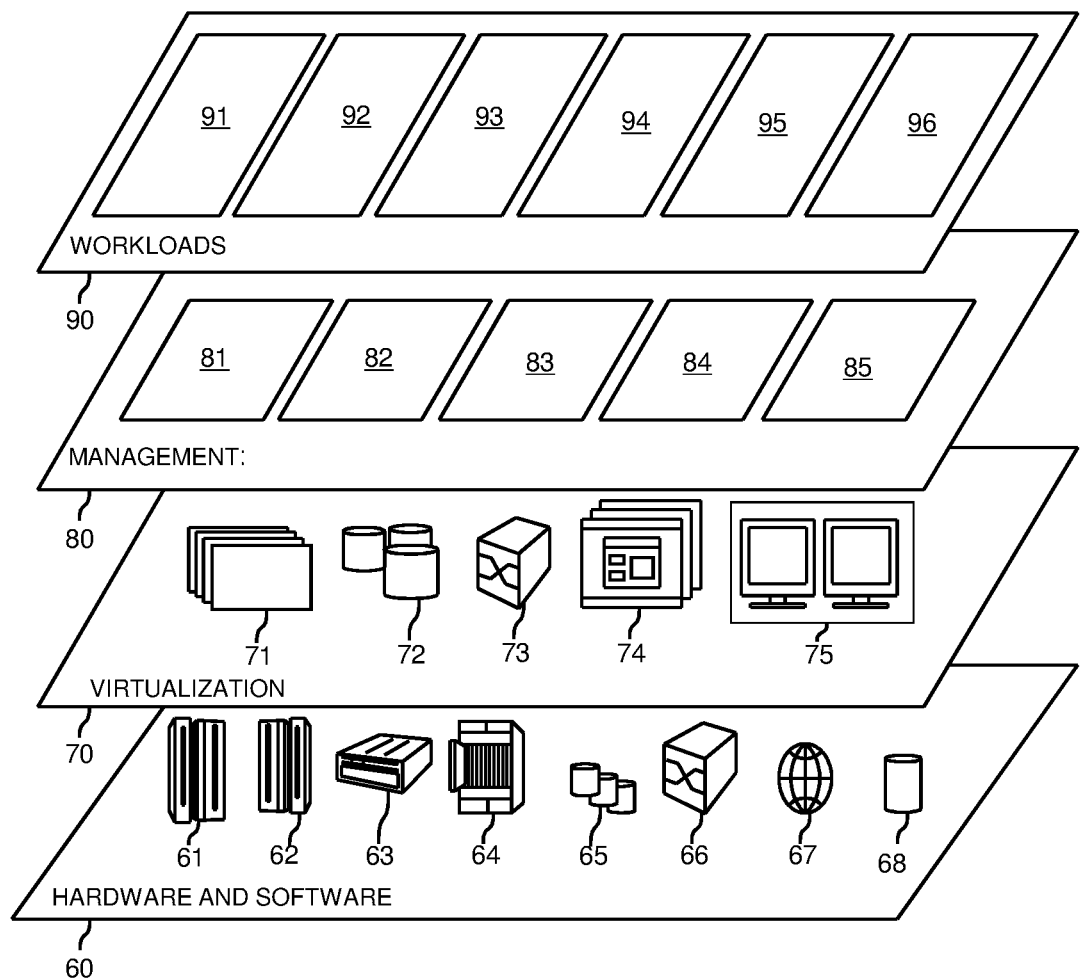
FIG. 9 is a diagram of abstraction model layers of a cloud computing environment in which aspects of the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and channel bandwidth management processing 96.

A computer program product in accordance with aspects of the present invention comprises one or more computer readable hardware storage devices having computer readable program code stored therein, said program code executable by one or more processors to implement the methods of the present invention.

A computer system in accordance with aspects of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method for managing bandwidth in Fibre Channel over Internet Protocol (FCIP) communication channels, comprising:
    monitoring traffic demand at an FCIP communication channel;
    applying cognitive forecasting by using machine learning on historical traffic demand and patterns with pre-scheduling of bandwidth to predict throughput demand of the FCIP communication channel; and
    in response to an anticipated period of throughput demand on the FCIP communication channel, dynamically changing a minimum and maximum bandwidth to reallocate bandwidth of unused tunnels.

2. The method as claimed in claim 1, further comprising:
    reallocating physical throughput bandwidth of the FCIP communication channel by configuring bandwidth of one or more tunnels of the FCIP communication channel,
    wherein configuring bandwidth of one or more tunnels includes adjusting a Transfer Communication Protocol (TCP) sliding window, and the monitoring the traffic demand at the FCIP communication channel comprises monitoring historical traffic demand including performance data from a Fibre Channel fabric including throughput demand data, insights data, and policy allocation requirements.

3. The method as claimed in claim 2, further comprising:
    when the FCIP communication channel has reached a maximum available bandwidth, increasing the maximum and minimum bandwidth of the one or more tunnels.

4. The method as claimed in claim 2, wherein configuring bandwidth of one or more tunnels includes managing a virtualization of an extension switch of the FCIP communication channel to control all tunnels and circuits of the extension switch.

5. The method as claimed in claim 4, wherein a tunnel of the extension switch includes multiple circuits forming a trunking tunnel with multiple circuits in a tunnel.

6. The method as claimed in claim 1, wherein monitoring traffic demand is carried out in real time and reallocating physical throughput bandwidth is carried out dynamically.

7. The method as claimed in claim 6, wherein the reallocating physical throughput bandwidth is pre-scheduled according to the predicted throughput demand.

8. The method as claimed in claim 7, wherein applying cognitive forecasting uses a machine learning method.

9. The method as claimed in claim 1, wherein tunnel scheduling is handled by a machine learning to ensure in-order delivery in trunking tunnels, and the dynamically changing the minimum and maximum bandwidth to reallocate bandwidth of unused tunnels further comprises changing tunneling parameters balanced across a network system to provide an adjusted bandwidth to a single circuit.

10. A system for managing bandwidth in Fibre Channel over Internet Protocol (FCIP) communication channels, comprising:
    a processor and a memory configured to provide computer program instructions to the processor, the program instructions executable to:
    monitor traffic demand at an FCIP communication channel by applying a cognitive forecasting by using machine learning on historical traffic demand and patterns with pre-scheduling of bandwidth to predict a throughput demand of the FCIP communication channel based on historical traffic demand and patterns; and
    in response to an anticipated period of the predicted throughput demand on the FCIP communication channel, configuring bandwidth of one or more tunnels of the FCIP communication channel.

11. The system as claimed in claim 10, wherein the configuring bandwidth of one or more tunnels includes adjusting a Transfer Communication Protocol (TCP) sliding window, and the monitoring the traffic demand at the FCIP communication channel comprises monitoring historical traffic demand including performance data from a Fibre Channel fabric including throughput demand data, insights data, and policy allocation requirements.

12. The system as claimed in claim 10, wherein the program instructions are executable to change tunneling parameters balanced across a network system in order to provide adjusted bandwidth to a single circuit.

13. The system as claimed in claim 10, wherein the program instructions are executable to manage a virtualization of an extension switch of the FCIP communication channel to control all tunnels and circuits of the extension switch.

14. The system as claimed in claim 13, wherein control of the tunnels and circuits of the extension switch is incorporated into a network advisor component.

15. The system as claimed in claim 13, wherein a tunnel of the extension switch includes multiple circuits forming a trunking tunnel with multiple circuits in a tunnel.

16. The system as claimed in claim 10, wherein the monitoring traffic demand includes monitoring of traffic demand at an FCIP communication channel in real time and the program instructions are executable to dynamically reallocate physical throughput bandwidth.

17. The system as claimed in claim 10, wherein the program instructions are executable to:
    monitor historical traffic patterns of a Fibre Channel fabric;
    apply the cognitive forecasting to predict throughput demand of the FCIP communication channel based on fabric performance data, tunnel performance data, or extension switch performance data; and
    reallocate physical throughput bandwidth by pre-scheduling according to the predicted throughput demand.

18. The system as claimed in claim 17, wherein the applying of the cognitive forecasting uses machine learning.

19. The system as claimed in claim 10, wherein the program instructions are executable to ensure in-order delivery in trunking tunnels.

20. A computer program product for managing bandwidth in Fibre Channel over Internet Protocol (FCIP) communication channels, the computer program product comprising a computer readable storage medium having program instructions embodied therewith, the program instructions executable by a processor to cause the processor to:
    monitor traffic demand at an FCIP communication channel by applying cognitive forecasting by using machine learning on historical traffic demand and patterns with pre-scheduling of bandwidth to predict a throughput demand of the FCIP communication channel; and in response to an anticipated period of the predicted throughput demand on the FCIP communication channel, dynamically changing a minimum and maximum bandwidth to reallocate bandwidth of unused tunnels.

* * * * *